UNITED STATES PATENT OFFICE.

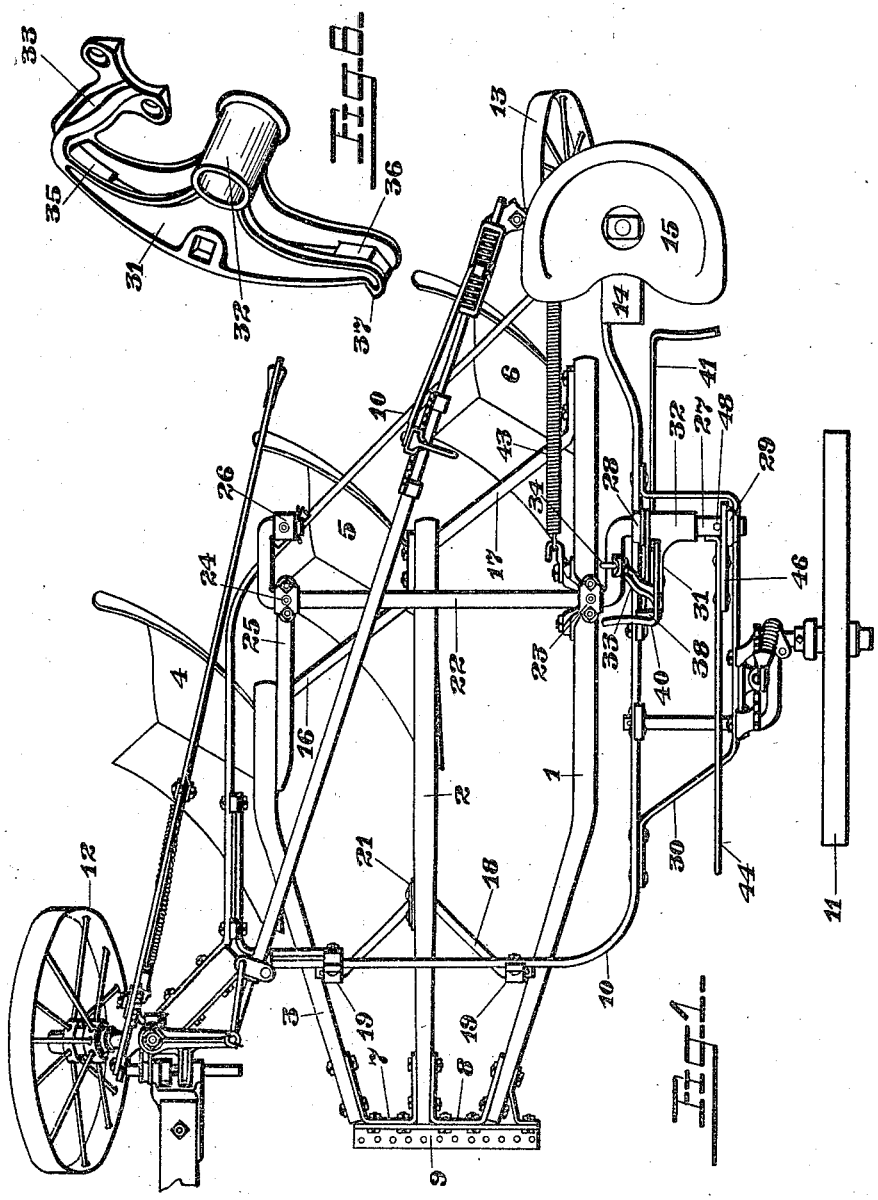

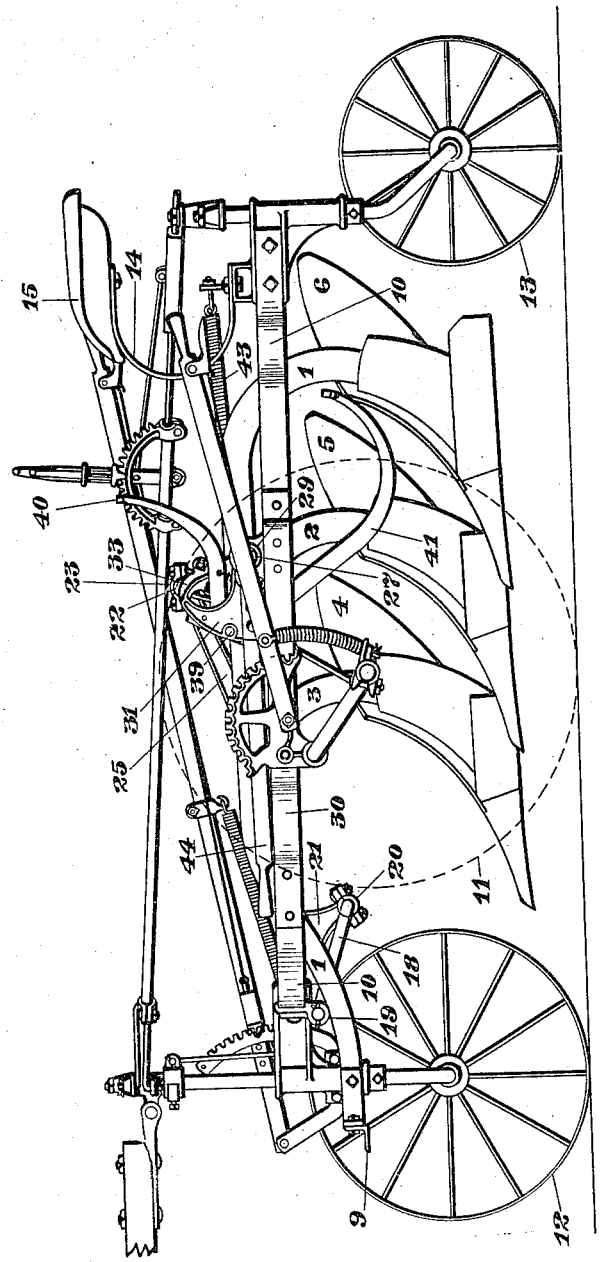

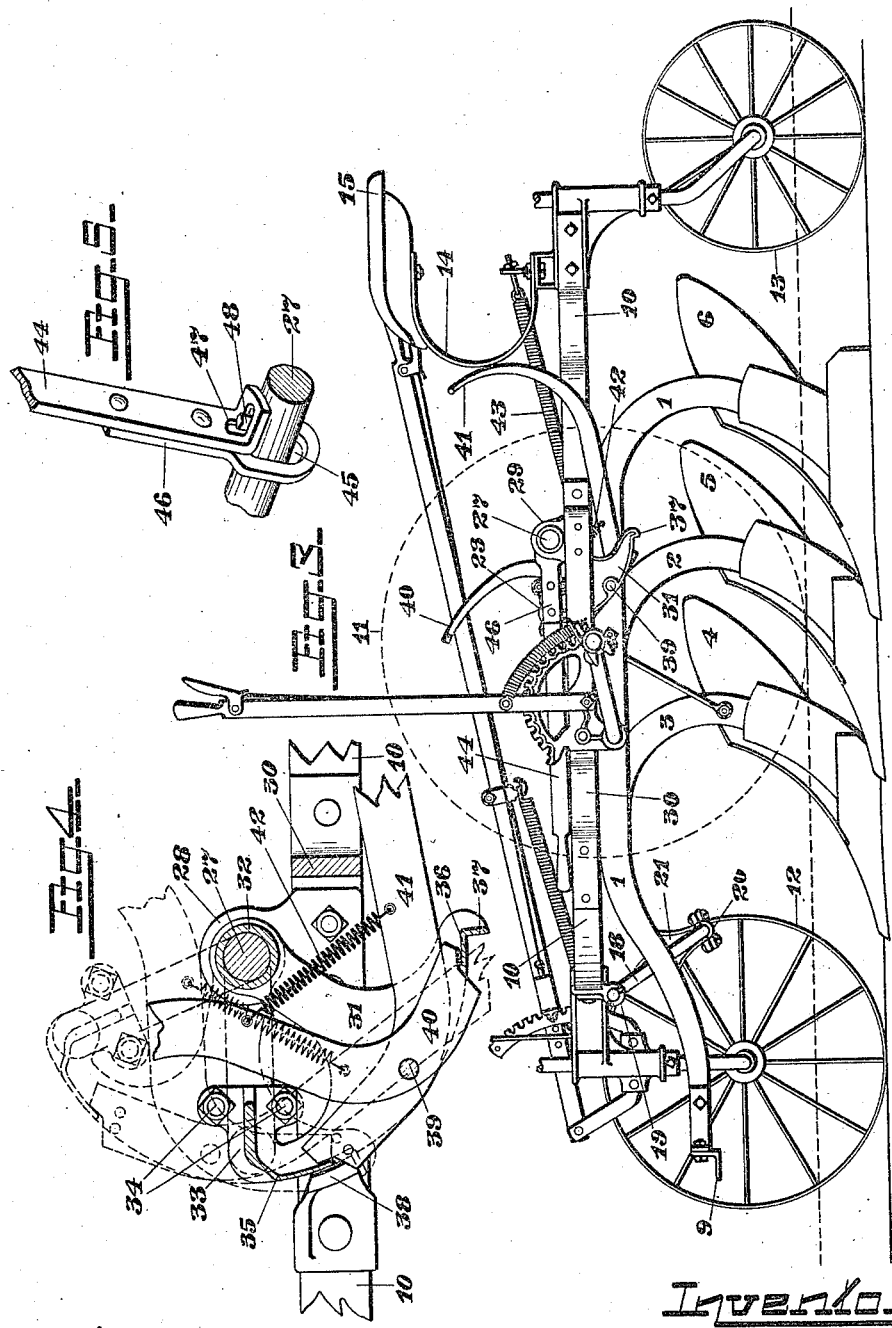

OTIS W. HOWARD, OF MOLINE, ILLINOIS, ASSIGNOR TO DEERE AND COMPANY, OF MOLINE, ILLINOIS, A CORPORATION OF ILLINOIS.

WHEELED PLOW.

1,296,081.   Specification of Letters Patent.   Patented Mar. 4, 1919.

Application filed May 4, 1915. Serial No. 25,665.

*To all whom it may concern:*

Be it known that I, OTIS W. HOWARD, a citizen of the United States, residing at Moline, in the county of Rock Island and State of Illinois, have invented certain new and useful Improvements in Wheeled Plows, of which the following is a specification, reference being had therein to the accompanying drawing.

My invention relates to wheeled plows and particularly to the means employed to lower the plows for operation, and to raise them from the ground whenever it is desired.

The object of my invention is to provide a simple and effective lever mechanism for raising and lowering a plow with a minimum of exertion on the part of the driver, and which will be automatically locked in either position and held securely against accidental unlocking.

A still further object of my invention is to simplify and condense the mechanism by which the plows are lowered or raised. Other objects will be disclosed in the following specification.

Referring to the drawings in which similar numerals indicate identical parts—

Figure 1 is a plan view of a wheeled plow embodying my improvements.

Fig. 2 is a side elevation of Fig. 1 with the plows raised and the land wheel removed.

Fig. 3 is a side elevation, similar to Fig. 2, but with the plows lowered and in the ground, and Figs. 4, 5 and 6 are details.

In the drawings I have shown a plow having three plowing units comprising beams 1, 2 and 3, on the rear ends of which are mounted plows 4, 5 and 6 of a well known type; beams 1 and 3, for a portion of their length, converge toward beam 2 to which they are rigidly connected by yoke shaped bars 7 and 8, the latter being bolted to the beams and to a draft bar 9 which extends across the front of the plow. The main frame 10 is supported by a land wheel 11 and front and rear furrow wheels 12 and 13. Mounted on the rear of the main frame 10 is a seat support 14 upon which a seat 15 is secured.

The beams 1, 2 and 3 are spaced apart by braces 16 and 17 extending between the beams rearwardly and rigidly bolted thereto. The plow is supported forwardly by a swinging bail 18 having its ends bent parallel to the main frame and held in bearings 19 thereon; the bail 18 is preferably V-shaped and extends from the main frame downwardly and rearwardly, the bend of the bail being journaled in a bearing 20 on the end of a downwardly projecting bracket 21 secured to the beam 2. A bail 22 is journaled in a bearing 23 on the beam 1, and also in a bearing 24 on an arm 25 rigidly secured on the beam 3. The forrowward end of the bail 22 is bent rearwardly and terminates in a lateral extension which is journaled in a bearing 26 on the main frame 10; the landward end of the bail 22 is bent similarly but the lateral extension thereof is prolonged into a spindle 27 which is journaled in a bearing 28 on the main frame 10, and a similar bearing 29 on a supplemental frame 30 rigidly connected to the main frame 10 and extending landwardly therefrom.

A segmental member 31, preferably formed as a casing, is provided with a sleeve 32, ordinarily integral therewith, by which it is mounted on the spindle 27; to hold the member 31 rigidly on the spindle 27 I employ an arm 33, in this instance integral with the member 31, which extends to the rearwardly projecting portion of the bail 22 to which it is rigidly secured by a U-bolt 34 as shown. The arcuate face of the member 31 is open except at the ends where it is closed by a web 35 at the upper end and by a similar web 36 at the lower end, both webs connecting the sides of the casing; the lower end of the member 31 forms a shoulder 37 which is adapted to contact with a stop 38 rigidly secured on the main frame 10.

Pivotally mounted on a bolt or pin 39 in the member 31, adjacent the arcuate face thereof and substantially intermediate its length, are foot levers 40 and 41; the foot lever 40 extends upwardly, and its lower portion extends rearwardly from the pivot bolt 39 and has a notch 42 in the end thereof one side of which is adapted to contact with the web 36; the foot lever 41 extends rearwardly from the pivot bolt 39 toward the seat 15, and forwardly from the pivot bolt 39, its forward end having a notch one side of which contacts with the web 35, and the other is adapted to engage with the underside of the stop 38. The notched ends of the levers 40 and 41 are extruded from the arcuate face of the member 31 by the action of a coiled spring 42 which is connected to both levers, and the tension of which is sufficiently strong to hold the levers 40 and 41 in operative position.

In Fig. 4 the levers 40 and 41 are shown in enlarged detail in full lines and in the same position shown in Fig. 3 with the plow lowered and in operation; it is assumed that it is desired to raise the plow, which is locked down by the notch in the end of the lever 41 engaging with the stop 38, the driver by pressure upon the rear end of the lever 41 rocks it on its pivot 39 disengaging the notched end from the stop 38 and bringing the lever 41 in contact with the web 37 of the member 31; continued pressure will rock the member 31 upwardly, and as the member 31 is rigidly connected to the bail 22, the latter will be rocked simultaneously in the same direction lifting the plow from the ground; the downward pressure upon the lever 41 is continued until the notch in the end of the lever 40 is above the top of the stop 38 with which it engages automatically by the tension of the spring 42; the pressure upon the lever 41 is now released and the plow is held raised and out of operation, the mechanism being in position as shown in full lines in Figs. 1 and 2, and in dotted lines in Fig. 4.

To lower the plow the lever 40 is rocked until the notch in the end thereof is disengaged from the upper side of the stop 38, the bail 22 will be rocked in the opposite direction by the weight of the plow and the latter will descend to its operative position where it is held by the notch in the end of the lever 41 again engaging with the stop 38, as shown in Fig. 3 and in Fig. 4. The ease of the operation of raising and lowering the plow is materially aided by a coil spring 43 connected with the rear of the main frame, and to the beam 1 by one of the bolts which secures the bearing 23 thereto, the spring acting as a counter balance to the weight of the plow.

An auxiliary hand lever 44 is loosely mounted on the spindle 27 by means of a slot 45, formed in the lower end of a member 46 forming part of the lever 44, and through which the spindle 27 extends; the lower end of the main portion of the lever 44 is bent at a right angle and has a slot 47 which is adapted to admit a pin 48 rigidly attached to the spindle 27. The hand lever 44 is operable to raise or lower the plow by engaging the slot 47 with the pin 48 and rocking the bail 22 after the lock by which the plow is held in position, has been broken by operating the lever 40 or 41 as the case may be. The hand lever 44 can be moved out of operative position by sliding it lengthwise of the spindle 27 until the pin 48 is free of the slot 47, when the lever can be rocked on the spindle 27 until it rests upon the frame 30 where it can remain out of the way of the operator until again needed.

What I claim is—

1. In a wheeled plow, the combination of a frame, a bail supported on the frame, a plow pivotally supported on the bail, means connected to said bail and operable to swing it to raise the plow, said means including a member rigidly connected to said bail, a lever pivoted intermediate its ends on said member and operable to rock said member and swing the bail to raise the plow, means to lock said plow in a raised position, means to break said lock to lower the plow, and a stop on the frame with which the forward end of said lever is adapted to contact to hold the plow down.

2. In a wheeled plow, the combination of a frame, a bail supported on the frame, a plow pivotally supported on the bail, means connected to said bail and operable to swing it to raise the plow, said means including a member rigidly connected to said bail, and two levers pivoted intermediate their ends on said member, one of said levers operable to rock said member and swing the bail to raise the plow, the second lever having its lower end adapted to engage with a stop on the frame to hold the plow in a raised position.

3. In a wheeled plow, the combination of a frame, a bail supported on the frame, a plow pivotally supported on the bail, means connected to said bail and operable to swing it to raise the plow, said means including a member rigidly connected to said bail, and two levers pivoted intermediate their ends on said member and having their lower ends extending in opposite directions, one of said levers operable to rock said member and swing the bail to raise the plow and having its lower end adapted to coact with a stop on the frame to hold the plow down, the second lever having its lower end adapted to engage with said stop to hold the plow in a raised position.

4. In a wheeled plow, the combination of a frame a bail supported on the frame, a plow pivotally supported on the bail, means connected to said bail and operable to swing it to raise the plow, said means including an arcuate member rigidly connected to said bail, and two levers pivoted intermediate their ends on a common pivot on said member and having their lower ends extending in opposite directions, one of said levers operable to rock said member and swing the bail to raise the plow and having its lower end adapted to coact with a stop on the frame to hold the plow in operative position when it is down, the second lever having its lower ends adapted to engage with said stop to hold the plow up when it is raised.

5. In a wheeled plow, the combination of a frame, a bail supported on the frame, a plow pivotally supported on the bail, means to swing said bail to raise and lower the plow, said means including a member rigidly secured on said bail and adapted to rock as the bail is swung, a lever pivotally mounted intermediate its ends on said member and operable to swing said bail and raise the plow, a stop on the frame, and a stop on said member adapted to contact with the stop on the frame to limit the upward movement of the plow.

In testimony whereof I affix my signature, in presence of two witnesses.

OTIS W. HOWARD.

Witnesses:
JESSIE SIMSER,
W. G. DUFFIELD.

Copies of this patent may be obtained for five cents each, by addressing the "Commissioner of Patents, Washington, D. C."